Figure 1:
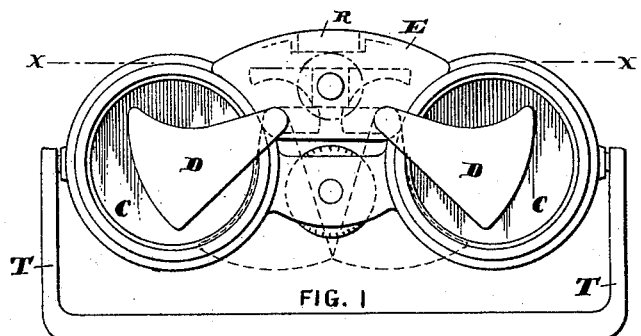

(No Model.)

C. E. PATTERSON.
COIN CONTROLLED OPERA GLASS.

No. 395,345. Patented Jan. 1, 1889.

Attest:
Henry Drury
E. M. Breckinrud

Inventor:
Clara E. Patterson
By her atty

United States Patent Office.

CLARA E. PATTERSON, OF NEW YORK, N. Y.

COIN-CONTROLLED OPERA-GLASS.

SPECIFICATION forming part of Letters Patent No. 395,345, dated January 1, 1889.

Application filed February 10, 1888. Serial No. 263,608. (No model.)

*To all whom it may concern:*

Be it known that I, CLARA E. PATTERSON, of the city, county, and State of New York, have invented an Improvement in Opera and other Magnifying Glasses, of which the following is a specification.

My invention has reference to opera and other magnifying glasses; and it consists of certain improvements which are fully set forth in the following specification, and shown in the accompanying drawings, which form part thereof.

In places of amusement it not infrequently happens that many in the audience not having opera-glasses would be willing to pay a nominal price for their use. To provide for this want it has been proposed to provide each seat with a box containing a pair of glasses which can be extracted and used only after placing a given coin (twenty-five cents, for instance) in a coin-actuated lock. In this way the proprietor of the glasses collects his revenue. The objection to this plan lies in the fact that the glasses employed are of the ordinary appearance and might be purloined by dishonest persons.

My object is to supply opera-glasses to theater-goers under substantially the same conditions; but in my case I arrange the glasses within ready reach of the person occupying the seat, and I form the glasses in such a manner that they are useless until the coin has been deposited within the glasses themselves.

In carrying out my invention I provide a shutter or shutters or equivalent obstruction adapted to be moved into the sight of vision and obstruct the lens or lenses. When the coin is deposited, these shutters may be moved by hand or automatically from over the lenses or glasses, and will remain off until they are reset. The lock for controlling the movement of the shutters is compact and within a suitable case on the glasses between the cylinders thereof. I prefer to make this lock operate by hand-pressure upon a push or pull pin and provide a suitable lock-controlling device, itself controlled by the coin deposited. In this manner I operate by the size of the coin and not by the weight, which latter requires very sensitive mechanism and would require the glasses to be held in a particular position when opening the shutter. This difficulty is entirely overcome in my preferred construction.

It is evident that, broadly considered, my invention comprehends the application to a pair of opera-glasses or a telescope of a money-receiving receptacle having a coin-slot, the same being made as a part of the glasses or telescope and moved with them as an incident to their use. It is evident that while I have a preference to a good mechanical construction of shutter and locking device, such as hereinafter set out, I am not limited to the details thereof, as many equivalent devices might be employed for the same purpose.

Figure 2:
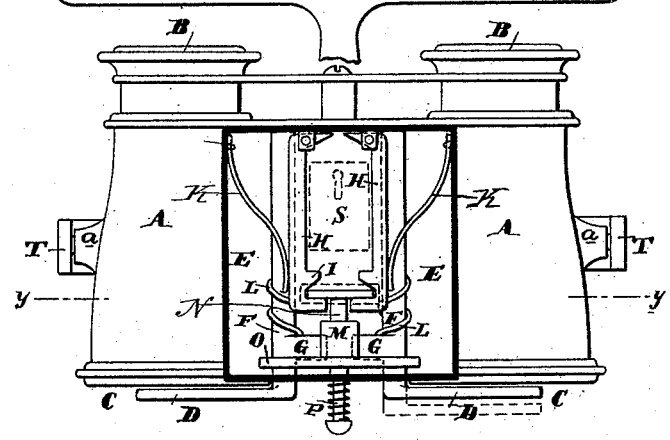
Figure 7:
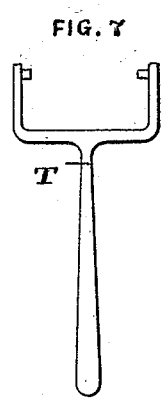
Figure 3:
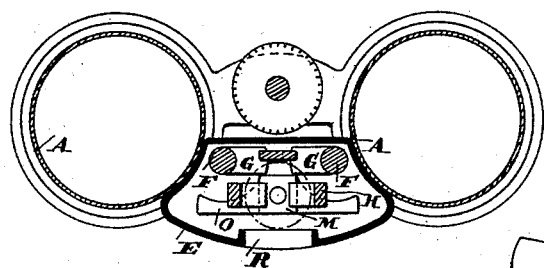
Figure 4:
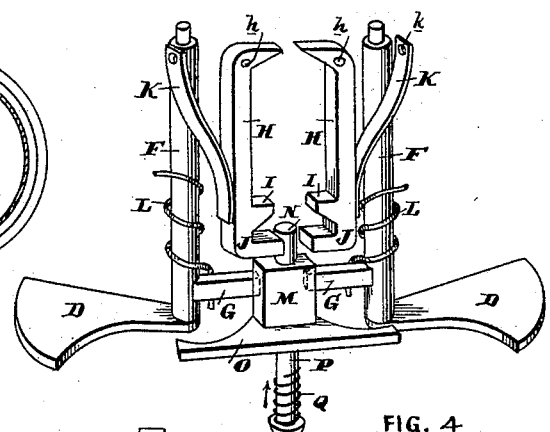
Figure 5:
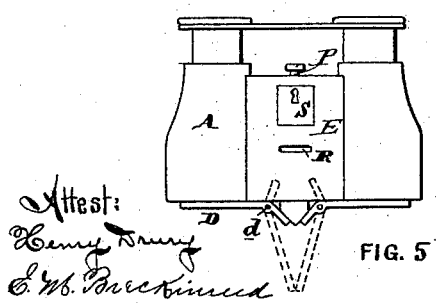
Figure 6:
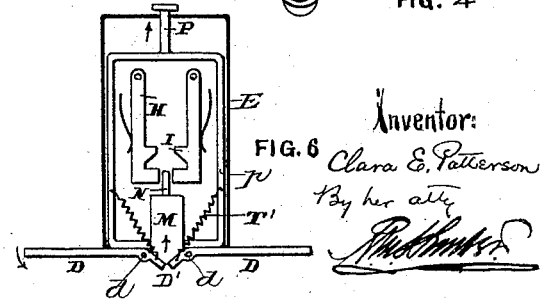

In the drawings, Figure 1 is a plan view of a pair of opera-glasses embodying my invention. Fig. 2 is a longitudinal sectional view of the same through the line *x x* of Fig. 1. Fig. 3 is a cross-sectional view of the same through the line *y y* of Fig. 2. Fig. 4 is a perspective view of the locking mechanism actuated by the coin detached from its box. Fig. 5 is an elevation of a pair of opera-glasses embodying a modification of my invention. Fig. 6 is a view of the mechanism actuated by the coin in this modification, and Fig. 7 is an elevation of the supporting-handle.

A is an ordinary opera-glass, having the eye or sight glasses B and the object-glasses C.

D are movable shutters constructed of any shape, which normally obstruct the vision through the object-glasses C. The mere shape of these shutters is immaterial, and that shown may be preferred because of the little space it occupies.

E is a box or frame to contain the locking mechanism.

F are two rods journaled in this box E and having their lower ends extending through it. To these ends the shutters D are rigidly secured or cast integral with them. These rods near their lower extremities, but within the box E, are provided with lugs or projections G, extending toward each other. The stop device consists of two arms, H, hinged or pivoted to the box E at *h*, and provided with extensions J at their lower ends and tapering extensions I slightly above the extensions J. These extensions J and I are so constructed that there is an opening or hiatus between the opposite ones, J J and I I, and a space between all large enough to receive the particular coin to be used in the apparatus. These arms H are provided with springs K, secured to the box at $k$, which normally keep the arms H in the proper perpendicular position.

L are springs, preferably spiral, about the rods F, which tend to throw the shutters open.

M is a lock having an extension, N, upon its upper part. This lock M is secured upon a plate, O, which is provided with a push-pin, P. This push-pin P extends through the box E, and is provided with a spring, Q, arranged in any suitable position.

It will be observed that the shape of the shutters is such as to require but little space when moved from the front of the lenses and yet of sufficient size to obstruct the center of the lenses. The edges of the shutters are also curved, so as to correspond with the curvature of the lenses, and thus not obstruct them when the shutters are drawn back their full distance. In this manner only a small movement is required.

Normally the shutters D are closed over the object-glasses C and cannot be opened or pushed back, as the lock M normally holds the extensions G of the rods F, and thus prevents these rods from turning and opening the shutters, which they would do in consequence of the springs L. For this purpose I prefer the construction described above on account of its great rigidity and firmness.

When it is desired to use the glasses, the coin is placed in the slot R in the box E and is held between the projections I I and J J. If the push-pin P is now pushed in, the extension N of the lock will press against the coin, which will in turn force open the arms H, owing to the tapering or bevel of the projections I, and allow the coin to enter the money-compartment. Meanwhile the lock M has been pushed up until it passes beyond the pins or projections G, which it normally holds to prevent the rods K from turning and releases them. The force of the springs L then turns the rods F and throws open the shutters D. The base or plate O is held by the projections G, which are now turned so as to be located immediately under it, acting as a latch to hold the lock M and its base-plate up, and the shutters are thus held open for use. The lock M fills up the opening between the arms H and prevents the coin falling back while the arms are opened. It is evident that to close the shutters again and relock them it is only necessary to turn them back over the object-glasses, when the projection G will be withdrawn from under the plate O, unlatching it, and the spring Q will draw the lock M back into its former position.

From the foregoing it will be observed that the parts H are essentially the locking device for the shutters, notwithstanding that there may be intermediate mechanism, M, which directly acts upon a part of the shutter mechanism proper. The locking of the shutters is dependent upon the parts H, and, as these parts are those which are actuated by the deposited coin, they, with the part M, form practically a coin-actuated locking device for the shutters. The parts H, specifically considered with reference to the part M, act as a stop or obstruction for said part M, which latter is the direct lock or latch for the shutters.

This construction I prefer on account of its solidity, firmness, and compactness; but it is evident that the principles of my invention may be embodied in various modifications, one of which is shown in Figs. 5 and 6. In this construction the entire frame (including parts P M N) carrying the locking mechanism M is moved by the push-pin, and the shutters D are hinged at $d$ to the bottom of the frame and have extensions or ends D', which are connected to the box by springs I', which tend to keep the shutters D open when the lock M has been drawn in by the handle or pin P. When the coin is placed in the slot, the entire frame, including P and M N, is drawn up by the push-pin, (see arrow,) and the shutters are automatically opened by the springs T. The extensions or ends D' are pulled into the opening through which the end of the lock M extended, and the shutters are thus held open during use. (See dotted lines.)

S is a door in the box E, through which the accumulated coins may be removed.

The opera-glasses may be pivoted or hinged to a forked or other shaped handle, T, by which the glasses may be supported in an easy manner. This handle will obviate the necessity of holding both arms in an elevated position, and would also form such an appendage to the glasses that they would be less likely to be stolen. The handle would also provide means for attaching a retaining-chain, if such were desired, without putting it into view.

It is evident that the details of construction here shown may be varied without departing from the principles of my invention, and they are therefore not to be considered limitations of it.

Having now described my invention, what I claim as new, and desire to secure by Letters Patent, is—

1. In an opera-glass or telescope, the combination of the object-glass with a movable shutter, a lock to hold the shutter closed over said glass, a coin-receiving box or receptacle, and lock-controlling devices actuated by the deposited coin to unlock said shutter.

2. In an opera-glass or telescope, the combination of the object-glass with a movable shutter, a lock to hold the shutter closed over said glass, a coin-receiving box or receptacle, lock-controlling devices actuated by the deposited coin to unlock said shutter, and a spring to cause said shutter to move from in front of the glass when unlocked.

3. In an opera-glass or telescope, the combination of the object-glass with a movable shutter, a lock to hold shutter closed over said glass, a coin-receiving box or receptacle, lock-controlling devices actuated by the deposited coin to unlock said shutter, and a spring to reset the lock and secure said shutter over the glass when turned to such position.

4. In an opera-glass or telescope, the combination of the object-glass with a movable shutter, a lock to hold the shutter closed over said glass, a coin-receiving box or receptacle, lock-controlling devices actuated by the deposited coin to unlock said shutter, a spring to cause said shutter to move from in front of the glass when unlocked, and a spring to reset the lock and secure said shutter over the glass when turned to such position.

5. In an opera-glass or telescope, the combination of the object-glass with a movable shutter, a lock to hold the shutter closed over said glass, a coin-receiving box or receptacle, lock-controlling devices actuated by the deposited coin to unlock said shutter, and a latch controlled by the shutter to prevent resetting of the lock until the shutter is closed over the glass.

6. In an opera-glass or telescope, the combination of a movable shutter adapted to obstruct the view through the lenses or glasses, a coin-receiving receptacle, a lock to control the movement of the shutter, a stop device to control the movement of the lock and adapted to receive the coin, and an extension on the lock to force the coin against the stop device to move it for the purpose of allowing movement to the lock.

7. In an opera-glass or telescope, the combination of a movable shutter adapted to obstruct the view through the lenses or glasses, a coin-receiving receptacle, a lock to control the movement of the shutter, a stop device to control the movement of the lock and adapted to receive the coin, an extension on the lock to force the coin against the stop device to move it for the purpose of allowing movement to the lock, and a latching device to hold the lock in its unlocking position and controlled by the shutter, whereby the lock cannot be reset until the shutter is turned over the glass again.

8. In an opera-glass or telescope, the combination of a movable shutter adapted to obstruct the view through the lenses or glasses, a coin-receiving receptacle, a lock to control the movement of the shutter, and an obstruction in the path of the lock adapted to be pushed out of the way by the coin when it is inserted and the lock pressed in, whereby the lock may be moved out of the way and allow the shutter to move from in front of the glass.

9. In an opera-glass or telescope, the combination of a movable shutter adapted to obstruct the view through the lenses or glasses, a coin-receiving receptacle, a lock to control the movement of the shutter, an obstruction in the passage of the lock adapted to be pushed out of the way by the coin when it is inserted and the lock pressed in, whereby the lock may be moved out of the way and allow the shutter to move from in front of the glass, and a spring to automatically throw the shutter from off the glass.

10. An opera-glass having a coin-receiving receptacle formed thereon and constituting a part thereof, and arranged between and secured to the two fixed cylinders of the glasses.

11. An opera-glass of the usual kind in which the lenses are held permanently and rigidly in line by the inclosing frame or case, in combination with two shutters secured to the frame or case and adapted to be moved in front of the center of the lenses to obstruct the vision through the lenses, springs to hold them in position off the lenses, and a coin-actuated lock to unlock said shutters upon the passage of a coin through the lock.

12. An opera-glass having two shutters pivoted or hinged to the frame of the glass between the cylinders and adapted to move in a plane parallel to the plane of the lenses to or from each other.

13. An opera-glass having a coin-receiving receptacle formed thereon and constituting a part thereof, arranged between the cylinders and provided with a slot for the coin and a coin-extracting door.

In testimony of which invention I hereunto set my hand.

CLARA E. PATTERSON.

Witnesses:
ERNEST HOWARD HUNTER,
RICHD. S. CHILD, Jr.